INVENTOR
ANDREW C. RICE

3,192,012
PROCESS FOR SEPARATING THE RARE EARTH ELEMENTS BY MEANS OF SOLVENT EXTRACTION
Andrew C. Rice, Reno, Nev., assignor to the United States of America as represented by the Secretary of the Interior
Filed Aug. 9, 1962, Ser. No. 216,005
12 Claims. (Cl. 23—23)
(Granted under Title 35, U.S. Code (1952), sec. 266)

This application is a continuation-in-part of application Serial No. 148,775, filed October 30, 1961.

The invention herein described and claimed may be manufactured and used by or for the Government of the United States of America for governmental purposes without the payment of royalties thereon or therefor.

This invention is concerned with a method for separation of rare earth elements by means of solvent extraction.

The term "rare earths" as used in the present specification includes the lanthanide rare earth elements having atomic numbers from 57 to 71, inclusive, and the element yttrium, atomic number 39 which is ordinarily found in rare earth concentrates and acts similarly to the rare earths in chemical operations.

The rare earths are usually obtained from ore concentrates of the oxides and are difficult to separate due to their great chemical similarity. Fractional crystallization has been employed to separate the rare earth oxide concentrates into their individual components. However, this procedure is a very laborious task and preparation of even comparatively pure individual rare earth species by this method is very difficult. More recently, a major advance occurred in separation of the rare earths with the discovery of the ion exchange method of obtaining individual rare earth species. While this method provides a very effective separation of rare earths, separation procedures are still too long and costly to enable development of a vigorous rare earth industry.

It is therefore an object of the present invention to provide a method for separation of rare earths which is rapid and inexpensive.

It has been found and is the subject of application Serial No. 148,775 that such a separation may be achieved by means of a liquid-liquid fractional solvent extraction process in which the rare earths are extracted from an aqueous solution of their salts by means of an amine.

It has now been found that the process may be substantially improved by addition of a complexing agent to the aqueous phase prior to extraction with the amine. The term "complexing agent" as employed in the present specification is generic to the terms "chelating agents" and "sequestering agents."

As described in application Serial No. 148,775, various amines will extract the rare earth elements from solutions of their salts into a diluent which is immiscible with water. For a given set of experimental conditions the percentage of each element transferred to the organic phase will differ. For example, under proper conditions of pH and concentration lanthanum and cerium are more completely extracted than the rare earths of higher atomic numbers. This difference in extractability and hence separability of the rare earths is enhanced by addition of a complexing agent to the aqueous phase. When a chelating agent such as ethylenediamine tetraacetic acid (hereinafter referred to as EDTA) is added to an aqueous solution of lanthanum and cerium and the heavier rare earths, the latter form the more stable chelates which are less extractable than the less stable chelates of the lighter elements. Accordingly, the separation of light and heavy elements is improved. The method may be employed for a wide variety of separations of single rare earth elements or groups of elements.

Effective separation of the rare earths requires that the percentage of each rare earth element extracted be appreciably different. Quantitatively, this is measured by the distribution coefficient, K, which is the ratio of the concentration of the element in the extract phase to the concentration of the element in the aqueous phase following extraction. Where two elements are present and concentrations are different in the extract and aqueous phases, this difference may be employed to separate them. This separation factor, $\beta$, is determined by the ratio of the two distribution coefficients, i.e., $$\beta = \frac{K_1}{K_2}$$

where $K_1$ and $K_2$ are the respective distribution coefficients of the two elements. Usually the ratio is arranged so that $\beta$ is greater than 1.

Hydrogen ion concentration may have a very significant effect on both the extracting power of the amines and the complexing power of the chelating agents. Since the most effective pH may vary widely according to the elements being separated and other experimental conditions, optimum pH must be determined experimentally. One procedure for visualizing the effect of pH is to plot curves of pH versus the separation factor, $\beta$. Experimental data of this type are shown in FIGS. 1–3 wherein.

Adjustment of pH is accomplished simply by addition of sulfuric acid.

The chelating agent should have a favorable difference in stability constant for each rare earth, a nearly linear variation in stability constant with atomic number and a selectivity for the rare earth element opposite that of the amine, i.e., it should prefer the heavier element if the amine preferentially extracts the lighter element. EDTA has been found to be particularly effective over the whole range of rare earth elements.

Figure 1:
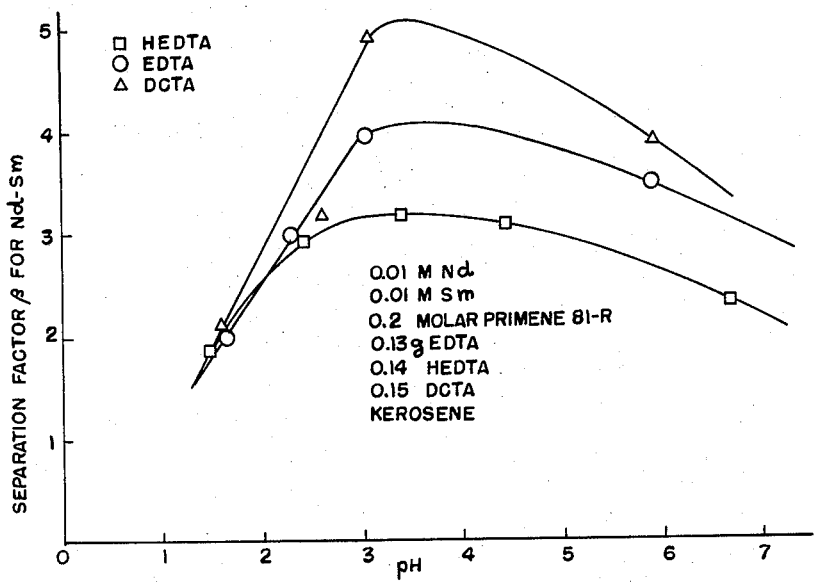
FIG. 1 is a graph showing the effect of pH on Nd-Sm separation with different chelating agents and Primence 81-R in kerosene.
Figure 2:
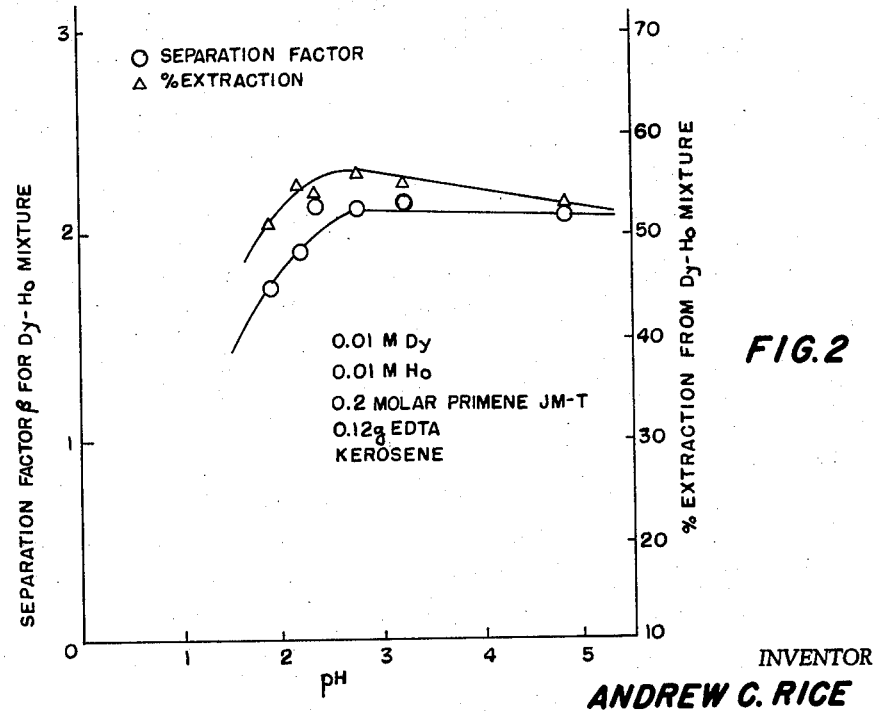
FIG. 2 is a graph showing the effect of pH on Dy-Ho separation and extraction with EDTA and Primene JM-T in kerosene.
Figure 3:
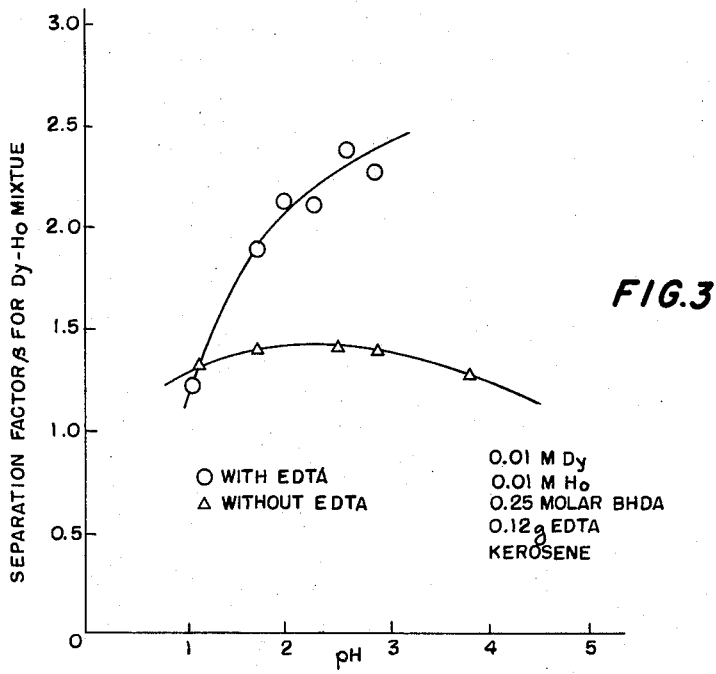
FIG. 3 is a graph showing the effect of pH on Dy-Ho separation with and without EDTA using BHDA (N-benzylheptadecylamine) in kerosene.
Figure 4:
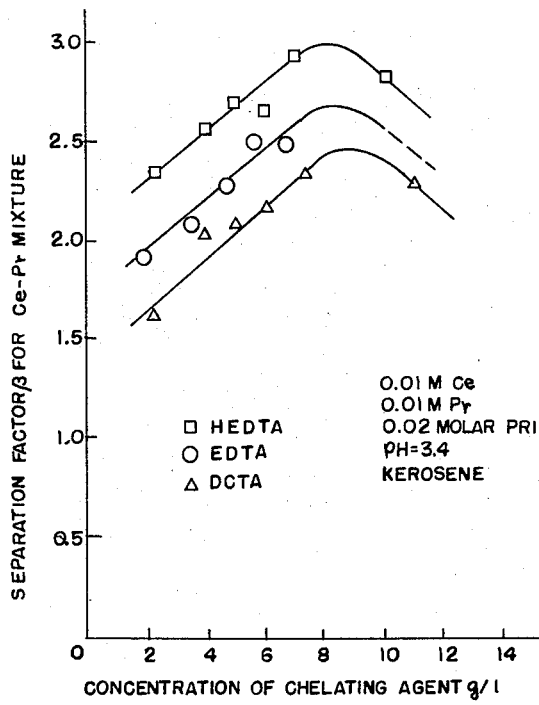

Other chelating agents effective for certain separations are nitrilotriacetic acid (NTA); 1,2-diaminocyclohexane tetraacetic acid (DCTA—available as Chel 600 from Geigy Chemical Corp.); N-hydroxy-ethylenediamine triacetic acid (HEDTA); diethylenetriamine pentaacetic acid (DTPA); citrate and α-isobutyrate. DTPA has been found to be particularly effective for separation of adjacent light rare earth elements (Example 3). The change in stability constants for rare earth chelates with increase in atomic number is not the same with different reagents. The constants formed with EDTA, DTPA, HEDTA and Chel 600 (DCTA) appear to offer the best opportunity for improvement of separations of the largest number of elements. Curves in which values for the separation factor are plotted against concentration of chelating agents are useful in determining the optimum amount of chelating agent for a particular separation. Experimental data of this type are shown in FIGS. 4–6 wherein:

FIG. 4 is a graph showing the effect of concentration of different chelating agents on Ce—Pr separation with Primene 81–R in kerosene.

Figure 5:
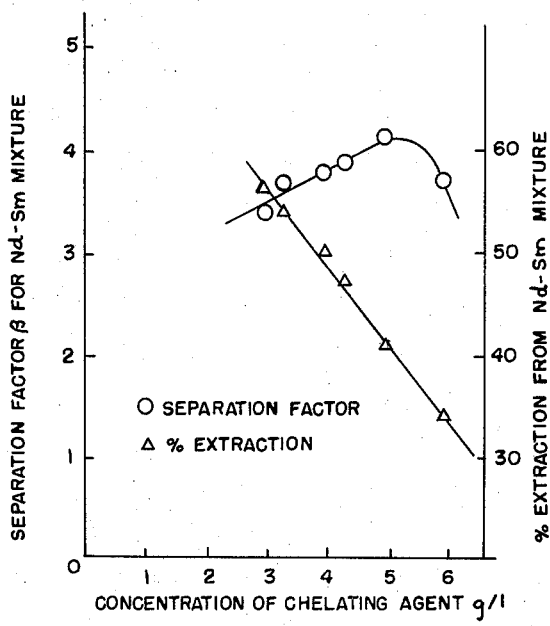

FIG. 5 is a graph showing the effect of concentration of EDTA on Nd—Sm separation and extraction with Primene 81-R in kerosene.

Figure 6:
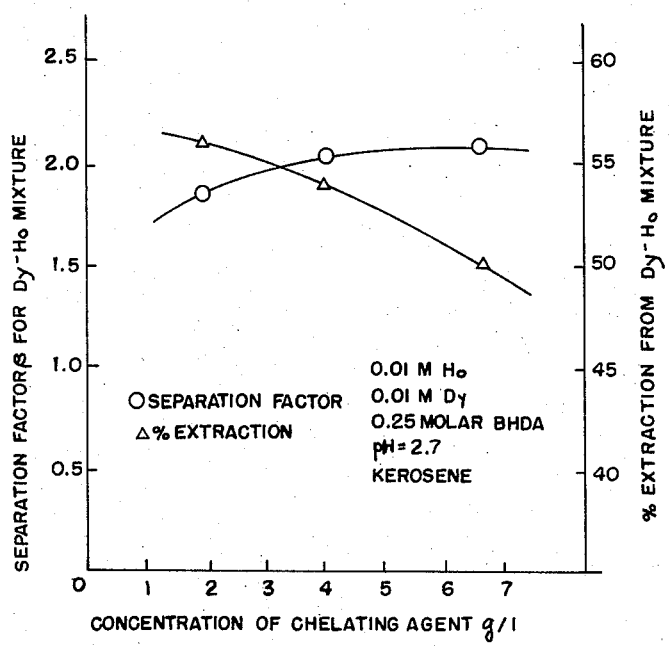

FIG. 6 is a graph showing the effect of concentration of EDTA on Dy—Ho separation with BHDA in kerosene.

The amines found to be most effective in the present invention are Primene 81-R, Primene JM-T and N-benzylheptadecylamine (BHDA). The Primenes are available from Rohm & Haas Company and have the following chemical composition and physical properties.

|  | Primene 81-R | Primene JM-T |
|---|---|---|
| Formula | Principally t-$C_{12}H_{25}NH_2$ to t-$C_{14}H_{29}NH_2$ | Principally t-$C_{18}H_{37}NH_2$ to t-$C_{21}H_{43}NH_2$. |
| Molecular weight | Principally 185-213 | Principally 269-311. |
| Neutral equivalent | 191 | 315. |
| Boiling range (760 mm.) | 5-90% at 221-238° C | 5-70% 265-305° C. |
| Specific gravity, 25° C | 0.813 | 0.840. |
| Refractive index, 25° C | 1.423 | 1.456. |
| Water, percent | 0.40 | 0.10. |
| Color | 42 (APHA) | 11 (varnish scale). |
| Flash point (tag., open cup) | 205° F | 265° F. |
| Solubility | Insoluble in water. Soluble in common organic solvents. Excellent solubility in petroleum hydrocarbons. | |

The concentrations of the amines in the water-immiscible diluent usually varies from about 0.1 to 0.5 molar. Solubility in water and in the organic diluent must also be considered in selecting a suitable amine.

The water immiscible diluent generally employed is kerosene. However, other diluents such as hexane, isopropyl ether, chloroform, benzene, methyl isobutyl ketone and mesityl oxide may be employed and for some separations may possess advantages in respect to clearness of phases or phase separations. Obviously a wide variety of solvents may be used provided they meet the requirements of being water-immiscible, nonreactive, do not depress the extraction coefficient, dissolve the amine employed and any of its salts with anions encountered in the extraction and stripping steps and have a viscosity and density which make for ready separation.

The concentration of the rare earth solution prior to extraction usually varies from about 0.005 to 0.05 molar. In some instances the maximum concentration may be limited by the tendency of the organic layer to become viscous or for a precipitate to form. For example, at pH values of 2 to 4 with Primene 81-R and kerosene, the elements lanthanum and cerium form viscous organic layers when their concentration exceeds 0.01 molar based on the volume of the organic phase. Also Primene 81-R with other diluents forms precipitates in the organic phase at a pH of 7 to 8 with all rare earth elements. Such precipitation can be controlled through selection of the amine and/or diluent and/or the pH value. In the case of lanthanum or cerium at a pH of 2 to 4, the viscous organic layers can be avoided by replacing Primene 81-R with Primene JM-T or by changing from kerosene to hexane as the diluent.

The volume ratio of organic to aqueous phases in the extraction step may vary widely and is best determined empirically. A mol ratio of amine to rare earth of about 10:1 is usually satisfactory but may also vary widely depending on the elements to be separated and the experimental conditions employed in the separation.

The following examples will serve to more particularly describe the invention.

EXAMPLE 1

In this example separation factors, $\beta$, were determined for different concentrations of EDTA in the aqueous phase in separation of praseodymium and neodymium. The aqueous phase contained Pr and Nd in solution in the form of sulfates (prepared by dissolving the oxides in sulfuric acid) and in concentrations of 0.01 molar. The immiscible diluent was kerosene and contained Primene 81-R in a concentration of 0.2 molar. The volume of each solution was 30 ml. Sufficient sulfuric acid was added to the aqueous phase to give it a final pH value of 3.0 after extraction. The aqueous and organic phases were shaken for three to four minutes in a separatory funnel by means of a mechanical shaker and the two phases were allowed to separate. After equilibrium was achieved the two phases were separated and their volumes measured. The amounts of Pr and Nd in each phase were then determined—the elements in the aqueous phase were precipitated directly as oxalates with oxalic acid, those in the organic phase were removed by stripping with dilute hydrochloric acid followed by precipitation as oxalates for subsequent ignition to the oxide for weighing. The distribution coefficients of the elements, i.e., the ratio of the concentration of element in aqueous phase to that in the organic phase, were then calculated. The ratio of the distribution coefficient for Pr to that for Nd gave the separation factor, $\beta$. Percent extractions were calculated from weights of mixed oxides in the organic phases. The results are summarized in Table 1.

Table 1.—Effect of change in amount of EDTA

| Expt. | Wt. of EDTA, g. | Percent ext. | Distribution coefficient | | $\beta$ |
|---|---|---|---|---|---|
| | | | Pr | Nd | $K_{Pr}/K_{Nd}$ |
| A | 0.20 | 45.9 | 1.403 | 0.623 | 2.25 |
| B | 0.18 | 48.5 | 1.708 | 0.769 | 2.22 |
| C | 0.16 | 52.5 | 1.903 | 0.872 | 2.18 |
| D | 0.12 | 61.7 | 2.618 | 1.230 | 2.13 |

EXAMPLE 2

This example shows the effect of different chelating agents (and no chelating agent) in separation of various pairs of rare earth elements. The rare earth elements, the chelating agents and the resulting separation factors are shown in Table 2. The reagents and conditions employed were otherwise the same as those of Example 1.

Table 2.—Separation factors ($\beta$) for rare earth pairs

| Rare earth pair | EDTA | Chel. 600 | NTA | HEDTA | No chelate |
|---|---|---|---|---|---|
| Nd-Sm | 3.8 | 3.9 | 2.5 | 3.0 | 2.0 |
| Pr-Nd | 2.2 | 2.1 | | 2.3 | 1.4 |
| Ce-Pr | 2.4 | 2.2 | | 2.6 | 1.3 |
| La-Ce | 4.2 | 4.5 | 5.0 | 4.2 | 1.4 |

It will be seen that the different chelating agents exhibit a variation in effectiveness for separation of specific rare earth pairs. However, all show a substantial improvement over the use of amine extractant without the simultaneous use of chelating agent.

EXAMPLE 3

This example illustrates the particular effectiveness of DTPA in separation of adjacent light rare earth elements. EDTA and DTPA were employed in 0.03 M concentration for separation of a mixture of lanthanum, neodymium and praseodymium from an aqueous solution of their sulfates using a 0.25 M concentration of Primene JM-T in hexane as the extractant. The concentration of the rare earth elements was 0.015 M La, 0.010 M Nd and 0.005 M Pr. The final pH of the aqueous phase after extraction was 3.8. The results are shown in Table 3.

Table 3

| Complexing agent | β Pr/Nd | β La/Pr | β La/Nd |
|---|---|---|---|
| EDTA | 2.1 | 6.5 | 13.6 |
| DTPA | 3.1 | 26.2 | 80.8 |

The effectiveness of the DTPA is apparent from the high values of the separation factor, β, when DTPA is employed as the complexing agent. This effectiveness of DTPA is believed due to larger differences between stability constants for light rare earth elements. Values of stability constants (log K) for DTPA are 19.96 for La, 21.83 for Pr and 22.24 for Nd. The corresponding values for EDTA are 14.72 for La, 15.75 for Pr. and 16.05 for Nd.

The extraction may be batchwise, as in the examples, or continuous. Intimate contact is provided by any of the usual means known to the art such as vigorous mixing or countercurrent flow over suitable baffles, etc. The separated aqueous phase, prior to recovery of rare earths, may be again treated batchwise with additional amine solution for further extraction or recycled to the extraction stage in a continuous process.

The invention is obviously capable of various modifications and changes without departing from the essential spirit and scope thereof.

What is claimed is:

1. A method for the separation of at least one rare earth element from at least one other rare earth element in an aqueous sulfate solution containing the rare earths in a concentration of about 0.005 to 0.05 mole per liter which comprises (1) adding to said solution about 2 to 10 grams per liter of the solution of a complexing agent selected from the group consisting of ethylenediamine tetraacetic acid, diethylenetriamine pentaacetic acid, nitrilotriacetic acid, 1, 2-diaminocyclohexane tetraacetic acid, N-hydroxyethylenediamine triacetic acid and α-isobutyrate, and (2) contacting said aqueous solution with an amine from the group consisting of a mixture of primary amines from t-$C_{12}H_{25}NH_2$ to t-$C_{14}H_{29}NH_2$ having a molecular weight of from about 185 to about 213, a mixture of primary amines from t-$C_{18}H_{37}NH_2$ to t-$C_{21}H_{43}NH_2$ having a molecular weight of about 269 to about 311 and N-benzylheptadecylamine, said amine being dissolved in an organic, water-immiscible inert solvent in a concentration of about 0.1 to 0.5 mole per liter, to form an organic extract phase and an aqueous raffinate phase, whereby at least one rare earth element is selectively transferred at least in part to the extract phase, separating the extract and raffinate phases, and recovering rare earths from said phases.

2. The method of claim 1 in which the complexing agent is diethylemetriamine pentaacetic acid.

3. The method of claim 1 in which the complexing agent is ethylenediamine tetraacetic acid.

4. The method of claim 1 in which the complexing agent is nitrilotriacetic acid.

5. The method of claim 1 in which the complexing agent is 1,2-diaminocyclohexane tetraacetic acid.

6. The method of claim 1 in which the complexing agent is N-hydroxyethylenediamine triacetic acid.

7. The method of claim 1 in which the amine is a mixture of primary amines from t-$C_{12}H_{25}NH_2$ to t-$C_{14}H_{29}NH_2$ having a molecular weight of from about 185 to about 213.

8. The method of claim 1 in which the amine is a mixture of primary amines from t-$C_{18}H_{37}NH_2$ to t-$C_{21}H_{43}NH_2$ having a molecular weight of about 269 to about 311.

9. The method of claim 1 in which the amine is N-benzylheptadecylamine.

10. The method of claim 1 in which the immiscible solvent is kerosene.

11. The method of claim 1 in which the immiscible solvent is hexane.

12. The method of claim 1 in which the pH of the aqueous solution after extraction is about 3.

References Cited by the Examiner

UNITED STATES PATENTS 2,910,442  10/61  Kaplan.

FOREIGN PATENTS 135,646  1961  U.S.S.R.

OTHER REFERENCES

Bauer et al.: "Bureau of Mines, Report of Investigations 5570," Dept. of Interior, Bureau of Mines, 1960, 10 pgs.

Coleman et al.: "Proceedings of the Second United Nations International Conference on the Peaceful Uses of Atomic Energy," vol. 28, United Nations, Geneva, 1958, pgs. 278–288.

Moeller et al.: "Journal of Inorganic and Nuclear Chemistry," vol. 12, December 1959, pgs. 49–59.

MAURICE A. BRINDISI, *Primary Examiner.*